(12) United States Patent
Walker et al.

(10) Patent No.: US 9,617,496 B2
(45) Date of Patent: Apr. 11, 2017

(54) METHOD FOR PREPARING A SULFURIZED ALKALINE EARTH METAL DODECYLPHENATE

(71) Applicant: The Lubrizol Corporation, Wickliffe, OH (US)

(72) Inventors: Gary M. Walker, Allestree (GB); Roger L. Sowerby, Concord Township, OH (US); James P. Roski, Willowick, OH (US); Roger L. Parsons, Chagrin Falls, OH (US); Christopher L. Friend, Nottingham (GB); Andre Grange, Cleveland, OH (US); Christopher J. Ciolli, Perry, OH (US); Mohamed G. Fahmy, Eastlake, OH (US); Jayasooriya Sujith Perera, Twinsburg, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 8 days.

(21) Appl. No.: 14/376,444

(22) PCT Filed: Feb. 6, 2013

(86) PCT No.: PCT/US2013/024877
§ 371 (c)(1),
(2) Date: Aug. 4, 2014

(87) PCT Pub. No.: WO2013/119623
PCT Pub. Date: Aug. 15, 2013

(65) Prior Publication Data
US 2015/0045269 A1    Feb. 12, 2015

Related U.S. Application Data

(66) Substitute for application No. 61/596,286, filed on Feb. 8, 2012.

(51) Int. Cl.
*C10M 159/22* (2006.01)
*C10M 135/02* (2006.01)
*C07G 99/00* (2009.01)

(52) U.S. Cl.
CPC .......... *C10M 159/22* (2013.01); *C07G 17/00* (2013.01); *C10M 135/02* (2013.01); *C10M 2207/028* (2013.01); *C10M 2219/02* (2013.01); *C10N 2210/02* (2013.01); *C10N 2230/52* (2013.01); *C10N 2270/00* (2013.01)

(58) Field of Classification Search
CPC .............. C10M 159/22; C10M 135/02; C10M 2207/028; C10M 2219/02; C10N 2210/02; C10N 2230/52; C10N 2270/00; C07G 17/00
USPC .................................................. 508/332, 591
See application file for complete search history.

(56) References Cited

U.S. PATENT DOCUMENTS

| | | | |
|---|---|---|---|
| 2,680,096 A | 6/1954 | Walker et al. | |
| 3,036,971 A | 5/1962 | Otto et al. | |
| 3,372,116 A | 3/1968 | Meinhardt et al. | |
| 3,464,970 A | 9/1969 | Sakai et al. | |
| 5,024,773 A | 6/1991 | Liston et al. | |
| 5,178,781 A * | 1/1993 | Hori ................... | C10M 159/22 508/574 |
| 7,435,709 B2 | 10/2008 | Stonebraker et al. | |
| 2007/0049508 A1 | 3/2007 | Stonebraker et al. | |
| 2008/0070818 A1 | 3/2008 | Arrowsmith et al. | |
| 2008/0269351 A1 | 10/2008 | Campbell et al. | |
| 2010/0029527 A1 | 2/2010 | Campbell et al. | |
| 2011/0118160 A1 | 5/2011 | Campbell et al. | |
| 2011/0124539 A1 | 5/2011 | Sinquin et al. | |
| 2011/0190185 A1 | 8/2011 | Sinquin et al. | |

FOREIGN PATENT DOCUMENTS

| | | | | |
|---|---|---|---|---|
| EP | 0601721 A2 * | 6/1994 | .......... | C10M 159/22 |
| WO | 2013059173 A1 | 4/2013 | | |

OTHER PUBLICATIONS

Written Opinion of the Corresponding International Application No. PCT/US2013/024877 dated Jun. 6, 2013.
Search Report of the Corresponding International Application No. PCT/US2013/024877 dated Jun. 6, 2013.
Corresponding International Publication No. WO2013/119623 A1 Published Aug. 15, 2013.

* cited by examiner

*Primary Examiner* — James Goloboy
(74) *Attorney, Agent, or Firm* — Christopher D. Hilker; David M. Shold; Teresan W. Gilbert

(57) ABSTRACT

A sulfurized alkaline earth metal (e.g., calcium) dodecylphenate is prepared by reacting (i) dodecylphenol with (ii) calcium hydroxide or calcium oxide in an amount of about 0.3 to about 0.7 moles per mole of dodecylphenol charged and (iii) an alkylene glycol in an amount of about 0.13 to about 0.6 moles per mole of dodecylphenol charged; and reacting the product of the first step with sulfur in an amount of about 1.6 to about 3 moles per mole of dodecylphenol charged; and thereafter optionally reacting the product with additional calcium hydroxide or calcium oxide and with carbon dioxide so as to form an overbased phenate. The product thus prepared has reduced levels of monomeric dodecylphenol.

14 Claims, No Drawings

METHOD FOR PREPARING A SULFURIZED ALKALINE EARTH METAL DODECYLPHENATE

BACKGROUND OF THE INVENTION

The disclosed technology relates to a process for preparing a sulfurized alkaline earth metal dodecylphenate containing a reduced amount of monomeric dodecylphenol.

Phenol-based detergents are known. Among these are phenates based on phenolic monomers, linked with sulfur bridges or alkylene bridges such as methylene linkages derived from formaldehyde. The phenolic monomers themselves are typically substituted with an aliphatic hydrocarbyl group to provide a measure of oil solubility. The hydrocarbyl groups may be alkyl groups, and, historically, dodecylphenol (or propylene tetramer-substituted phenol) has been widely used. An early reference to basic sulfurized polyvalent metal phenates is U.S. Pat. No. 2,680,096, Walker et al., Jun. 1, 1954; see also U.S. Pat. No. 3,372,116, Meinhardt, Mar. 6, 1968. Additionally, U.S. Pat. No. 3,036,971, Otto, May 29, 1962, discloses lubricating oils containing carbonated basic sulfurized calcium phenates. Its preparation includes the use of a glycol containing less than 6 carbon atoms.

U.S. Pat. No. 3,464,970, Sakai et al., Sep. 2, 1969, similarly discloses an overbased sulfurized calcium phenate by heating a mixture of phenolic compounds, dihydric alcohol, elementary sulfur and calcium compounds. Somewhat later, U.S. Pat. No. 5,024,773, Liston, Jun. 18, 1991, discloses a method of preparing group II metal overbased sulfurized alkylphenols involving use of a sulfurization catalyst. The product is said to have lower crude sediment, higher Total Base Number, and lower viscosity. EP 601721, Ethyl Petroleum, Jun. 15, 1994, discloses a process for preparing overbased phenates.

Recently, however, certain alkylphenols and products prepared from them have come under increased scrutiny due to their association as potential endocrine disruptive materials. In particular, alkylphenol detergents which are based on oligomers of $C_{12}$ alkyl phenols may contain residual monomeric $C_{12}$ alkyl phenol species. There is interest, therefore, in developing alkyl-substituted phenate detergents, for uses in lubricants, fuels, and as industrial additives, which contain a reduced amount of dodecylphenol component.

There have been several efforts to prepare phenate detergents that do not contain $C_{12}$ alkyl phenols or contain reduced amounts of such materials. In some cases these efforts have involved avoiding or minimizing the presence of $C_{12}$ alkylphenol as a reactant. For instance, U.S. Pat. No. 7,435,709, Stonebraker et al., Oct. 14, 2008, discloses a linear alkylphenol-derived detergent substantially free of endocrine disruptive chemicals. It comprises a salt of a reaction product of (1) an olefin having at least 10 carbon atoms, where greater than 90 mole % of the olefin is a linear $C_{20}$-$C_{30}$ n-alpha olefin, and wherein less than 10 mole % of the olefin is a linear olefin of less than 20 carbon atoms, and less than 5 mole % of the olefin a branched chain olefin of 18 carbons or less, and (2) a hydroxyaromatic compound.

U.S. Application 2011/0190185, Sinquin et al., Aug. 4, 2011, discloses an overbased salt of an oligomerized alkylhydroxyaromatic compound. The alkyl group is derived from an olefin mixture comprising propylene oligomers having an initial boiling point of at least about 195° C. and a final boiling point of greater than 325° C. The propylene oligomers may contain a distribution of carbon atoms that comprise at least about 50 weight percent of $C_{14}$ to $C_{20}$ carbon atoms.

U.S. Application 2011/0124539, Sinquin et al., May 26, 2011, discloses an overbased, sulfurized salt of an alkylated hydroxyaromatic compound. The alkyl substituent is a residue of at least one isomerized olefin having from 15 to about 99 wt. % branching. The hydroxyaromatic compound may be phenol, cresols, xylenols, or mixtures thereof.

U.S. Application 2011/0118160, Campbell et al., May 19, 2011, discloses an alkylated hydroxyaromatic compound substantially free of endocrine disruptive chemicals. An alkylated hydroxyaromatic compound is prepared by reacting a hydroxyaromatic compound with at least one branched olefinic propylene oligomer having from about 20 to about 80 carbon atoms. Suitable hydroxyaromatic compounds include phenol, catechol, resorcinol, hydroquinone, pyrogallol, cresol, and the like.

U.S. Provisional Application Ser. No. 61/549,286, Cook et al., filed Oct. 20, 2011, discloses other bridged hydrocarbyl- (e.g., alkyl-) phenol compounds and their salts, free from or substantially free from C-12 alkyl phenol moieties.

U.S. Application 2008/0070818, Arrowsmith et al., Mar. 30, 2008, discloses a lubricating oil composition including a sulphurized overbased metal phenate detergent prepared from a $C_9$-$C_{15}$ alkyl phenol, a sulphurizing agent, a metal, and an overbasing agent. The detergent includes less than 6.0% by combined mass of unsulphurized $C_9$-$C_{15}$ alkyl phenol and unsulphurized metal salts thereof. The detergent may also include a further surfactant. An olefin may be used to remove active sulphur from the sulphurized $C_9$-$C_{15}$ alkyl substituted phenol. The lubricating oil composition is said to exhibit an improved rate of acid neutralization.

U.S. Application 2007-049508, Stonebreaker et al., Mar. 1, 2007, discloses a linear alkylphenol-derived detergent substantially free of endocrine disruptive chemicals. A hydroxyaromatic compound is reacted with an olefin having at least 10 carbon atoms. Greater than 80 mole % of the olefin is a linear $C_{20}$-$C_{30}$ n-alpha olefin; less than 10 mole % of the olefin is a linear olefin of less than 20 carbon atoms, and less than 5 mole % of the olefin is branched chain olefin of 18 carbons or less.

U.S. Application 2008-0269351, Campbell, Oct. 30, 2008, discloses an alkylated hydroxyaromatic compound prepared by reacting a hydroxy aromatic compound with a branched olefin oligomer having from about 20 to about 80 atoms.

U.S. Application 2010-029527, Campbell et al., Feb. 4, 2010, discloses an overbased salt of an oligomerized alkylhydroxyaromatic compound. The alkyl group of the compound is derived from an olefin mixture comprising propylene oligomers having an initial boiling point of at least about 195° C.

The disclosed technology, provides a method for preparing phenate detergent which contains a reduced amount of monomeric dodecylphenol within an oligomeric dodecylphenol composition. The resulting phenate detergent may also have an increased amount tetramer and higher oligomers of the dodecylphenol, which may lead to further performance benefits.

SUMMARY OF THE INVENTION

The disclosed technology provides a process for preparing a sulfurized alkaline earth dodecylphenate, comprising (a) reacting (i) dodecylphenol with (ii) an alkaline earth metal hydroxide or oxide in an amount of 0.25 or 0.3 to 0.7 moles per mole of dodecylphenol charged, and (iii) an alkylene glycol in an amount of about 0.13 to 0.6 or to 0.26 moles per mole of dodecylphenol charged and (b) reacting the product of step (a) with (iv) sulfur in an amount of 1.6 or 1.8 to 3 moles per mole of dodecylphenol charged and thereafter optionally (c) reacting the product of step (b) with additional calcium hydroxide or calcium oxide and with carbon dioxide so as to form an overbased phenate.

DETAILED DESCRIPTION OF THE INVENTION

Various preferred features and embodiments will be described below by way of non-limiting illustration.

One of the materials used in the presently disclosed technology is a sulfur-bridged phenolic compound. Such materials in general, their methods of preparation, and use in lubricants are well known from, for instance, the above-referenced U.S. Pat. No. 2,680,096, Walker et al. They may be prepared starting from phenol or, alternatively, a short chain alkyl phenol such as cresol (o-, m-, or p-methylphenol), or mixtures thereof, any of which are readily available as starting materials. The alkylation of phenol and its homologues is well known, typically by catalyzed reaction of an olefin, often an α-olefin, with phenol (or with cresol or another homologue, as the case may be). Alkylation of phenol is described in greater detail in the Kirk-Othmer *Encyclopedia of Chemical Technology*, third edition (1978) vol. 2, pages 82-86, John Wiley and Sons, New York.

Linking of alkyl (or more generally, hydrocarbyl) phenols to form oligomeric species, is also well known. They may be linked together to make sulfur bridged species, which may include bridges of single sulfur atoms (—S—) or multiple sulfur atoms (e.g., —$S_n$— where n may be 2 to 8, typically 2 or 3). Typically there may be 1, 2, or 3, or often 1, S atom per linkage. Sulfurized phenols may be prepared by reaction with active sulfur species such as sulfur monochloride or sulfur dichloride as described on pages 79-80 of the Kirk-Othmer reference or with elemental sulfur, as described, for instance, in U.S. Pat. No. 2,680,096. Sulfurization (with sulfur) may be conducted in the presence of a basic metal compound such as calcium hydroxide or calcium oxide, thus preparing a metal salt, as described in greater detail, below.

The process of the disclosed technology begins with an alkylphenol which comprises a dodecylphenol and, in particular paradodecylphenol, ("PDDP"). Other substituted phenols may be present as well as the PDDP, but the PDDP will typically comprise at least 50 weight percent of the monomeric phenolic component and may be 50 to 100 weight percent, or 60 to 99% or 70 to 98% or 80 to 97% or 90-96% or 95 to 98%. Typically, a commercial grade of PDDP will be used, such that phenolic components other than PDDP will be those materials that are present along with the PDDP in the commercial grade material. Thus, a certain amount of other isomers may be present, predominantly ortho-dodecylphenol or meta-dodecylphenol, but there may also be an amount of unsubstituted phenol and an amount of unreacted dodecene, as well as a minor amount of dialkylated material. Moreover, since dodecylphenols are typically prepared by the reaction of a propylene tetramer with a phenol, certain amounts of material having C9 or C15 alkyl groups, or a mixture of alkyl groups having 9 (or fewer) to 15 (or more) carbon atoms, may also be present. Some of these may result from reaction with propylene trimer or pentamer. Characteristically, the amount of such other materials may be 5 or 15 to 50 percent or 20 to 40, or 25 to 35, or 35 to 40 percent by weight, in commercial PDDP. The amounts of PDDP referred to herein generally refer to the total amount of the commercial grade, which would include such isomers, byproducts, and other materials. However, when the amount of "residual PDDP" is reported, those amounts normally include mixtures of closely related monomeric materials such as ortho- and para-isomers from C9 to C15 alkylphenols, typically excluding dialkylated materials.

The PDDP is initially reacted with a basic alkaline earth metal material, where the alkaline earth metal may typically be calcium or magnesium, or in some embodiments, calcium. Suitable basic materials include calcium (or magnesium) hydroxide or calcium (or magnesium) oxide, typically calcium hydroxide, in the presence of an alkylene glycol. The alkylene glycol (that is, diol) may be ethylene glycol or it may, alternatively, be a heavier glycol such as 1,2- or 1,3-propylene glycol or a butylene glycol. As it is often considered to be desirable able to remove the alkylene diol after the reaction is complete, use of a diol having 6 or fewer or 5, 4, or 3 or fewer carbon atoms, or a normal boiling point of less than 230 or 220 or 210° C. may be desirable. Ethylene glycol will typically be used.

The PDDP, the basic alkaline earth metal material, and the alkylene glycol will be mixed together in certain specified ratios. Typical amounts and conditions are reported herein for calcium materials, but the corresponding amounts and conditions for magnesium or other alkaline earth metal materials can be readily derived therefrom: amounts on a molar basis may be the same, for instance; on a weight basis, the appropriate correction can be readily made by the skilled person. The amount of calcium material (for example, calcium hydroxide) will typically be present in an amount of 0.3 to 0.7 moles per mole of dodecylphenol charged. Alternative amounts of the basic calcium material may be 0.35 to 0.6 moles per mole or 0.4 to 0.5 moles per mole of dodecylphenol charged. (The references herein to the amount of dodecylphenol "charged" refers to the amount initially charged to the reactor, since it is expected that in the course of subsequent reaction the dodecylphenol will no longer be present in its initial acidic, monomeric form.) The amount of the alkylene glycol will typically be 0.13 to 0.6, or to 0.5, or to 0.4, or to 0.3, or to 0.26 moles per mole of dodecylphenol charged, or alternatively 0.15 to 0.23 or 0.17 to 0.21 moles per mole. Thus, the amount of calcium base and the alkylene glycol will each typically be significantly more than has been conventionally employed at this stage.

This first stage of reaction is maintained at elevated temperature, typically 80 to 150° C., or 100 to 149° C., or 95 to 130° C., or 100 to 125° C. In one embodiment the temperature of the reaction mixture is increased during this first stage, in that the PDDP may be initially heated to 90 to 110° C., e.g., about 100° C., and after the other components are added, the mixture may be further heated to 120 to 130° C., e.g., about 124 or 125° C.

This first stage of reaction will be continued for a period of time sufficient to effect substantially complete neutralization of the PDDP with the basic calcium compound, typically 15-30 minutes. At this stage and in subsequent stages of the reaction, volatile materials may be removed by distillation or they may be retained in the reaction mixture.

At the end of the first stage of reaction, sulfur is charged to the reaction mixture. The amount of sulfur will typically be 1.8 to 3 moles (calculated assuming monomeric S) per mole of dodecylphenol charged. Alternative amounts can be 1.9 to 2.9 or 2 to 2.8 or 2.2 to 2.7 or 2.5 to 2.7 moles per mole. Thus, the amount of sulfur employed will typically be significantly more than has been conventionally employed at this stage.

The reaction with the sulfur will be conducted at an elevated temperature, typically 160 to 230° C., or 170 to 230° C., or 180 to 230° C., or 190 to 225, or 200 to 220, or 210 to 220° C. Thus, the temperature of reaction may be higher than has been conventionally employed at this stage. The reaction mixture will be maintained at this elevated temperature for a period of time sufficient to permit reaction to occur to the desired extent, which will, of course, depend to some extent on the temperature selected. Typical times of reaction may be ½ to 20 hours, or 1 to 10, or 2 to 9, or 3 to 8, or 4 to 7, or 5 to 6 hours. During this time, at least a portion of the volatile components may be removed by distillation.

Within the product obtained by the process of the disclosed technology, the mole ratio of sulfur to PDDP monomer units will typically be 0.95:1 to 1.5:1, or 0.95:1 to 1.35:1, or 1.0:1 to 1.2:1, or 1.01:1 to 1.15:1, or about 1.1:1. These amounts refer to the S incorporated into the actual product, rather than the amount charged. Some of the sulfur charged to the reaction (typically 50%) may not be incorporated into the product and may be removed in the form of, e.g., hydrogen sulfide.

At this point, the product will be predominantly a calcium salt (or other, corresponding alkaline earth metal salt) of the sulfur-bridged PDDP oligomer, and it will have a reduced amount of free PDDP (or salt thereof). The product may be permitted to cool to room temperature and used as-is. Alternatively, diluent oil may be added to permit easier handling. In certain embodiments, 10 to 50, or 20 to 30, or 22 to 28 parts by weight of oil may be added per 100 parts of PDDP initially charged.

The calcium salt of the sulfur-bridged PDDP oligomer may be optionally overbased, if desired. Overbased materials, otherwise referred to as overbased or superbased salts, are generally homogeneous Newtonian systems characterized by a metal content in excess of that which would be present for neutralization according to the stoichiometry of the metal and the particular acidic organic compound reacted with the metal. Overbased materials are prepared by reacting an acidic material (typically an inorganic acid or lower carboxylic acid, typically carbon dioxide) with a mixture comprising an acidic organic compound (in this instance, the sulfurized phenol or phenate), a reaction medium of at least one inert, organic solvent (e.g., mineral oil, naphtha, toluene, xylene) for said acidic organic material, a stoichiometric excess of a metal base, and a promoter such as a phenol or alcohol. The amount of excess metal is commonly expressed in terms of metal ratio. The term "metal ratio" is the ratio of the total equivalents of the metal to the equivalents of the acidic organic compound. A neutral metal salt has a metal ratio of one. A salt having 4.5 times as much metal as present in a normal salt will have metal excess of 3.5 equivalents, or a ratio of 4.5.

Overbased detergents are often characterized by Total Base Number (TBN). TBN is the amount of strong acid needed to neutralize all of the overbased material's basicity, expressed as potassium hydroxide equivalents (mg KOH per gram of sample). Since overbased detergents are commonly provided in a form which contains a certain amount of diluent oil, for example, 40-50% oil, the actual TBN value for such a detergent will depend on the amount of such diluent oil present, irrespective of the "inherent" basicity of the overbased material. For the purposes of the present invention, the TBN of an overbased detergent is to be recalculated to an oil-free basis, except as noted. Detergents which are useful in the present invention typically have a TBN (oil-free basis) of 100 to 800, and in one embodiment 150 to 750, and in another, 400 to 700. The overall TBN of the composition, including oil, will be derived from the TBN contribution of the individual components, such as the dispersant, the detergent, and other basic materials.

The metal compounds useful in making the basic metal salts are generally any Group 1 or Group 2 metal compounds (CAS version of the Periodic Table of the Elements). The Group 1 metals of the metal compound include Group 1a alkali metals such as sodium, potassium, and lithium, as well as Group 1b metals such as copper. The Group 2 metals of the metal base include the Group 2a alkaline earth metals such as magnesium, calcium, and barium, as well as the Group 2b metals such as zinc or cadmium. In one embodiment the Group 2 metals are magnesium, calcium, barium, or zinc, and in another embodiments magnesium or calcium or, in particular, calcium. In certain embodiments the metal is calcium or sodium or a mixture of calcium and sodium. Generally the metal compounds are delivered as metal salts. The anionic portion of the salt can be hydroxide, oxide, carbonate, borate, or nitrate.

Such overbased materials are well known to those skilled in the art. Patents describing techniques for making basic salts of sulfonic acids, carboxylic acids, (hydrocarbyl-substituted) phenols, phosphonic acids, and mixtures of any two or more of these include U.S. Pat. Nos. 2,501,731; 2,616,905; 2,616,911; 2,616,925; 2,777,874; 3,256,186; 3,384,585; 3,365,396; 3,320,162; 3,318,809; 3,488,284; and 3,629,109.

In the case of the presently disclosed technology, overbasing may be conducted by supplying an excess of basic calcium material and other components to the above-described reaction product or intermediate, that is the material that is predominantly a calcium salt of the sulfur-bridged PDDP oligomer. The calcium salt of the sulfur-bridged PDDP oligomer will typically be present along with diluent oil, as described above. In a typical process, the oil-diluted oligomer may be initially heated to an elevated temperature such as 100 to 150° C., e.g., 120-140 or 130-140° C., and then treated with additional basic calcium material, and additional hydroxy-containing materials such as alkylene glycol (as described above) and/or an alcohol. The additional basic calcium material may be calcium oxide or calcium hydroxide, typically calcium hydroxide, and it may be added in an amount to provide an overbased material having a TBN of 200 to 600, on an oil-free basis, or 300 to 500, or 350 to 450 TBN. Such amounts may correspond to 0.5 to 3, or 1 to 2, or 1.2 to 1.8, or 1.4 to 1.7 moles per mole dodecylphenol charged. If an alkylene glycol such as ethylene glycol is added, it may be added in an amount of 0.5 to 2 or 0.8 to 1.5 or 1.0 to 1.2 moles per mole of dodecylphenol charged. If an additional alcohol is also present, it may be selected from monools having 6 to 20 carbon atoms, such as 7 to 18 or 8 to 14 or 9 to 12 carbon atoms. In one embodiment, the alcohol may be decyl alcohol. The amount of the alcohol (such as decyl alcohol) may be 0.3 to 1.5, or 0.5 to 1.0, or 0.5 to 0.7 moles per mole of dodecylphenol charged. Optionally a small amount of an alkylbenzenesulfonic acid may be present, e.g., 0.005 to 0.05 moles per mole of dodecylphenol charged, or 0.01 to 0.04 or 0.015 to 0.025 moles per mole. The alkyl group of the alkylbenzenesulfonic acid may be a group of sufficient length to provide a useful measure of oil-solubility to the compound, and may be, for instance, a polyisobutenes group with molecular weight of 1000 to 3000.

The mixture may then be further heated to 140-190° C. or 150-180° C. or 160-170° C. At such elevated temperature, an acidic material such as, typically carbon dioxide, may be blown into the reaction mixture to complete the preparation of the overbased material. The amount of carbon dioxide may be an amount added until an excess is observed that is not absorbed by the reaction mixture. Such an amount will depend on the amount of basic calcium material that is present, and any other basic materials, but in some embodiments may amount to 0.5 to 2 or 1 to 1.5 or 1.1 to 1.3 or 0.9 to 1.1 moles per mole dodecylphenol charged. The reaction with the carbon dioxide may take place over 1 to 10 hours, or 2 to 8 or 3 to 6 or 3.5 to 5 hours.

If desired, a portion of the sulfur may be added to the reaction mixture during the overbasing process, that is, during step (c). In certain embodiments up to 50 weight percent of the total sulfur may be added during the overbasing process, or 1 to 40 or 3 to 30 or 5 to 20 or 10 to 15 percent added during overbasing. The total amount of sulfur added throughout the steps of the preparation, that is, all the steps of the process, would not normally exceed 3 moles per mole of dodecylphenol charged. Addition of a portion of the sulfur during the overbasing process may lead to further reduction in free dodecylphenol level.

Following treatment with carbon dioxide, the reaction mixture may be further heated under reduced pressure to remove volatile materials. Such conditions might include 200 to 250° C. or 210 to 230° C. or 210 to 220° C., at pressures of less than 20,000 Pa, e.g., 1,000 to 10,000, or 2000 to 6000, or 3000 to 5500 Pa, or less than 5500 Pa. The resulting mixture may be cooled and filtered by conventional means to yield the overbased sulfur-bridged PDDP oligomer. It may be further diluted with diluent oil, if desired, to provide a product of the desired concentration or viscosity, and optionally a small amount of dispersant may be added.

The sulfurized calcium dodecylphenate prepared by the present invention will have significantly reduced level of free dodecylphenol than those prepared by conventional means. A large portion of the improvement is obtained in the first stage of the reaction, that is, before the overbasing step. Additional reduction may be effected during the overbasing process by operating within the parameters described herein.

The amount of free PDDP monomer (including sulfurized monomer) in the material of the disclosed technology will typically be 0 to 3 percent by weight based on the final overbased product, including oil, Ca salts, and other nonvolatile species (the volatiles typically having been removed by stripping or other means), alternatively 0.1 to 2.8 percent, or 0.2 to 2.5 percent, or 0.5 to 2.3 percent, or 1 to 2.2 percent. Alternatively, the reduction in the amount of free PDDP monomer may be evaluated as a reduction in the amount which has not been converted to oligomer. In a conventional process and material, there may be, e.g., 20 or 25 percent of the originally charged PDDP that is not converted to the oligomeric form, that is, e.g., 75 to 80 percent conversion of the PDDP. The materials of the disclosed technology, in contrast, will have a significantly higher conversion of PDDP to the oligomeric form, such as at least 85 percent, e.g., 85 to 98 percent, or 90 to 96 percent, or 92 to 95 percent. The corresponding amount of unreacted PDDP may be 15 percent or less, e.g., 2 to 15 percent, or 4 to 10 percent, or 5 to 8 percent, based on the total amount of PDDP units present (both monomeric and polymeric/oligomeric).

The amount of monomeric PDDP within the product may be determined by reverse phase ultra-high performance liquid chromatography by comparison with calibration standards prepared containing known amounts of PDDP, using a UV detector at 225 nm. The solvent for the sample may be a mixture of 15% acetic acid in methyl-t-butyl ether. Suitable conditions may involve injection of a 2 μL sample of filtered material onto a 100×2.1 mm Waters UPLC® column with 1.7 μm particle size packing. The column temperature may be 40° C. and a flow rate of eluent may be 0.35 μL/min, with a gradient of eluent composition from 75% methanol/25% water to 100% methanol. The PDDP monomer amount is determined by integration of the appropriate peaks.

The amount of the bridged phenolic compound, when it is present as an overbased detergent in a lubricant, may vary depending on the end-use application. When used in a passenger car lubricant it may be present as low as 0.1 weight percent, and when used in a marine diesel cylinder lubricant it may be present in amounts as high as 25 percent by weight of the lubricant. Therefore, suitable ranges may include 0.1 to 25%, or 0.5 to 20%, or 1 to 18% or 3 to 13% or 5 to 10%, or 0.7 to 5 weight percent or 1 to 3 weight percent, all on an oil-free basis Similar overall amounts may also be used if the bridged phenolic compound is not overbased.

Either a single detergent or multiple detergents can be present. If there are multiple detergents, the additional detergents may be additional phenate detergents, or they may be detergents of other types. An example of another type of detergent is a sulfonate detergent, prepared from a sulfonic acid. Suitable sulfonic acids include sulfonic and thiosulfonic acids, including mono or polynuclear aromatic or cycloaliphatic compounds. Certain oil-soluble sulfonates can be represented by $R^2T(SO_3^-)_a$ or $R^3(SO_3^-)_b$, where a and b are each at least one; T is a cyclic nucleus such as benzene or toluene; $R^2$ is an aliphatic group such as alkyl, alkenyl, alkoxy, or alkoxyalkyl; $(R^2)$-T typically contains a total of at least 15 carbon atoms; and $R^3$ is an aliphatic hydrocarbyl group typically containing at least 15 carbon atoms. The groups T, $R^2$, and $R^3$ can also contain other inorganic or organic substituents. In one embodiment the sulfonate detergent may be a predominantly linear alkylbenzenesulfonate detergent having a metal ratio of at least 8 as described in paragraphs [0026] to [0037] of US Patent Application 2005-065045. In some embodiments the linear alkyl group may be attached to the benzene ring anywhere along the linear chain of the alkyl group, but often in the 2, 3 or 4 position of the linear chain, and in some instances predominantly in the 2 position.

Another overbased material is an overbased saligenin detergent. Overbased saligenin detergents are commonly overbased magnesium salts which are based on saligenin derivatives. A general example of such a saligenin derivative can be represented by the formula

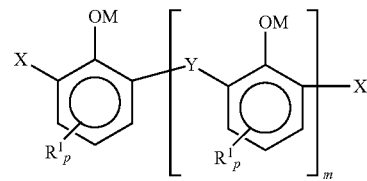

where X is —CHO or —CH$_2$OH, Y is —CH$_2$— or —CH$_2$OCH$_2$—, and the —CHO groups typically comprise at least 10 mole percent of the X and Y groups; M is hydrogen, ammonium, or a valence of a metal ion (that is, if M is multivalent, one of the valences is satisfied by the illustrated structure and other valences are satisfied by other species such as anions or by another instance of the same structure), $R^1$ is a hydrocarbyl group of 1 to 60 carbon atoms, m is 0 to typically 10, and each p is independently 0, 1, 2, or 3, provided that at least one aromatic ring contains an $R^1$ substituent and that the total number of carbon atoms in all $R^1$ groups is at least 7. When m is 1 or greater, one of the X groups can be hydrogen. In one embodiment, M is a valence of a Mg ion or a mixture of Mg and hydrogen. Saligenin detergents are disclosed in greater detail in U.S. Pat. No. 6,310,009, with special reference to their methods of synthesis (Column 8 and Example 1) and preferred amounts of the various species of X and Y (Column 6). Saligenin detergents may be seen as a species of phenate detergents, and therefore it may be desirable that they be prepared with the selection of $R^1$ groups made so as to satisfy the requirements in terms of number of carbon atoms as in the bridged phenolic compounds described in greater detail above. (That is, there may be in one embodiment a mixture of long chain and short chain groups in the ranges of 1 to 8 and at least 25 carbon atoms, such that the average number of carbon atoms in the groups is 10 to 100, or other ranges as set forth above and the detergent or the unneutralized compound is substantially free of monomer units of $C_{12}$ alkyl phenol.)

Salixarate detergents are overbased materials that can be represented by a compound comprising at least one unit of formula (I) or formula (II):

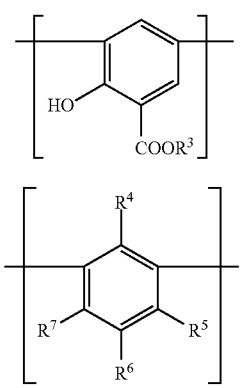

(I)

(II)

each end of the compound having a terminal group of formula (III) or (IV):

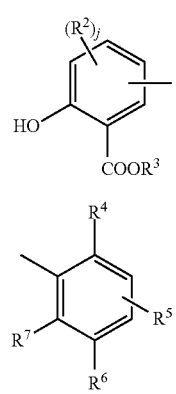

(III)

(IV)

such groups being linked by divalent bridging groups A, which may be the same or different. In formulas (I)-(IV) $R^3$ is hydrogen, a hydrocarbyl group, or a valence of a metal ion; $R^2$ is hydroxyl or a hydrocarbyl group, and j is 0, 1, or 2; $R^6$ is hydrogen, a hydrocarbyl group, or a hetero-substituted hydrocarbyl group; either $R^4$ is hydroxyl and $R^5$ and $R^7$ are independently either hydrogen, a hydrocarbyl group, or hetero-substituted hydrocarbyl group, or else $R^5$ and $R^7$ are both hydroxyl and $R^4$ is hydrogen, a hydrocarbyl group, or a hetero-substituted hydrocarbyl group; provided that at least one of $R^4$, $R^5$, $R^6$ and $R^7$ is hydrocarbyl containing at least 8 carbon atoms; and wherein the molecules on average contain at least one of unit (I) or (III) and at least one of unit (II) or (IV) and the ratio of the total number of units (I) and (III) to the total number of units of (II) and (IV) in the composition is 0.1:1 to 2:1. The divalent bridging group "A," which may be the same or different in each occurrence, includes —$CH_2$— and —$CH_2OCH_2$—, either of which may be derived from formaldehyde or a formaldehyde equivalent (e.g., paraform, formalin). If desired, the salixarate materials may be prepared with a selection of groups $R^5$, $R^6$, and $R^7$ made so as to satisfy the requirements in terms of number of carbon atoms is in the bridged phenolic compounds described in greater detail above.

Salixarate derivatives and methods of their preparation are described in greater detail in U.S. Pat. No. 6,200,936 and PCT Publication WO 01/56968. It is believed that the salixarate derivatives have a predominantly linear, rather than macrocyclic, structure, although both structures are intended to be encompassed by the term "salixarate."

Glyoxylate detergents are similar overbased materials which are based on an anionic group which, in one embodiment, may have the structure

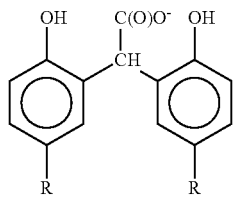

wherein each R is independently an alkyl group containing at least 4 or 8 carbon atoms, provided that the total number of carbon atoms in all such R groups is at least 12 or 16 or 24. Alternatively, each R can be an olefin polymer substituent. The acidic material from which the overbased glyoxylate detergent is prepared is the condensation product of a hydroxyaromatic material such as a hydrocarbyl-substituted phenol with a carboxylic reactant such as glyoxylic acid or another omega-oxoalkanoic acid. If desired, the glyoxylate materials may be prepared with a selection of R groups made so as to satisfy the requirements in terms of number of carbon atoms is in the bridged phenolic compounds described in greater detail above. Overbased glyoxylic detergents and their methods of preparation are disclosed in greater detail in U.S. Pat. No. 6,310,011 and references cited therein.

The overbased detergent can also be an overbased salicylate, e.g., an alkali metal or alkaline earth metal salt of a substituted salicylic acid. The salicylic acids may be hydrocarbyl-substituted wherein each substituent contains an average of at least 8 carbon atoms per substituent and 1 to 3 substituents per molecule. The substituents can be polyalkene substituents. In one embodiment, the hydrocarbyl substituent group contains 7 to 300 carbon atoms and can be an alkyl group having a molecular weight of 150 to 2000. Overbased salicylate detergents and their methods of preparation are disclosed in U.S. Pat. Nos. 4,719,023 and 3,372,116.

Other overbased detergents can include overbased detergents having a Mannich base structure, as disclosed in U.S. Pat. No. 6,569,818.

The amount of any supplemental overbased detergent or detergents, if present in a lubricant, may be 0.1 to 20, or 0.5 to 18, or 1, 2, or 3 to 13 percent by weight.

The materials of the disclosed technology are typically employed in an oil to form a composition that may be used as a lubricant. The oil is typically referred to as an oil of lubricating viscosity, also referred to as a base oil. The base oil may be selected from any of the base oils in Groups I-V of the American Petroleum Institute (API) Base Oil Interchangeability Guidelines, namely

| Base Oil Category | Sulfur (%) | | Saturates (%) | Viscosity Index |
| --- | --- | --- | --- | --- |
| Group I | >0.03 | and/or | <90 | 80 to 120 |
| Group II | ≤0.03 | and | ≥90 | 80 to 120 |
| Group III | ≤0.03 | and | ≥90 | >120 |
| Group IV | All polyalphaolefins (PAOs) | | | |
| Group V | All others not included in Groups I, II, III or IV | | | |

Groups I, II and III are mineral oil base stocks. The oil of lubricating viscosity can include natural or synthetic oils and mixtures thereof. Mixture of mineral oil and synthetic oils, e.g., polyalphaolefin oils and/or polyester oils, may be used.

Natural oils include animal oils and vegetable oils (e.g. vegetable acid esters) as well as mineral lubricating oils such as liquid petroleum oils and solvent-treated or acid treated mineral lubricating oils of the paraffinic, naphthenic, or mixed paraffinic-naphthenic types. Hydro treated or hydrocracked oils are also useful oils of lubricating viscosity. Oils of lubricating viscosity derived from coal or shale are also useful.

Synthetic oils include hydrocarbon oils and halosubstituted hydrocarbon oils such as polymerized and interpolymerized olefins and mixtures thereof, alkylbenzenes, polyphenyl, alkylated diphenyl ethers, and alkylated diphenyl sulfides and their derivatives, analogs and homologues thereof. Alkylene oxide polymers and interpolymers and derivatives thereof, and those where terminal hydroxyl groups have been modified by, e.g., esterification or etherification, are other classes of synthetic lubricating oils. Other suitable synthetic lubricating oils comprise esters of dicarboxylic acids and those made from C5 to C12 monocarboxylic acids and polyols or polyol ethers. Other synthetic lubricating oils include liquid esters of phosphorus-containing acids, polymeric tetrahydrofurans, silicon-based oils such as poly-alkyl-, polyaryl-, polyalkoxy-, or polyaryloxy-siloxane oils, and silicate oils.

Other synthetic oils include those produced by Fischer-Tropsch reactions, typically hydroisomerized Fischer-Tropsch hydrocarbons or waxes. In one embodiment oils may be prepared by a Fischer-Tropsch gas-to-liquid synthetic procedure as well as other gas-to-liquid oils.

Unrefined, refined, and rerefined oils, either natural or synthetic (as well as mixtures thereof) of the types disclosed hereinabove can be used. Unrefined oils are those obtained directly from a natural or synthetic source without further purification treatment. Refined oils are similar to the unrefined oils except they have been further treated in one or more purification steps to improve one or more properties. Rerefined oils are obtained by processes similar to those used to obtain refined oils applied to refined oils which have been already used in service. Rerefined oils often are additionally processed to remove spent additives and oil breakdown products.

The amount of the oil of lubricating viscosity present in a lubricant is typically the balance remaining after subtracting from 100 weight % the sum of the amount of the compound of the disclosed technology and the other performance additives.

Lubricants prepared using the materials of the presently-disclosed technology will typically contain one or more additional additive of the types that are known to be used as lubricant additives. One such additive is a dispersant. Dispersants are well known in the field of lubricants and include primarily what is known as ashless-type dispersants and polymeric dispersants. Ashless type dispersants are characterized by a polar group attached to a relatively high molecular weight hydrocarbon chain. Typical ashless dispersants include nitrogen-containing dispersants such as N-substituted long chain alkenyl succinimides, also known as succinimide dispersants. Succinimide dispersants are more fully described in U.S. Pat. Nos. 4,234,435 and 3,172,892. Another class of ashless dispersant is high molecular weight esters, prepared by reaction of a hydrocarbyl acylating agent and a polyhydric aliphatic alcohol such as glycerol, pentaerythritol, or sorbitol. Such materials are described in more detail in U.S. Pat. No. 3,381,022. Another class of ashless dispersant is Mannich bases. These are materials which are formed by the condensation of a higher molecular weight, alkyl substituted phenol, an alkylene polyamine, and an aldehyde such as formaldehyde and are described in more detail in U.S. Pat. No. 3,634,515. Other dispersants include polymeric dispersant additives, which are generally hydrocarbon-based polymers which contain polar functionality to impart dispersancy characteristics to the polymer. Dispersants can also be post-treated by reaction with any of a variety of agents. Among these are urea, thiourea, dimercaptothiadiazoles, carbon disulfide, aldehydes, ketones, carboxylic acids, hydrocarbon-substituted succinic anhydrides, nitriles, epoxides, boron compounds, and phosphorus compounds. References detailing such treatment are listed in U.S. Pat. No. 4,654,403. The amount of dispersant in the present composition can typically be 1 to 10 weight percent, or 1.5 to 9.0 percent, or 2.0 to 8.0 percent, all expressed on an oil-free basis.

Another component is an antioxidant. Antioxidants encompass phenolic antioxidants, which may comprise a butyl substituted phenol containing 2 or 3 t-butyl groups. The para position may also be occupied by a hydrocarbyl group, an ester-containing group, or a group bridging two aromatic rings. Antioxidants also include aromatic amine, such as nonylated diphenylamines or (optionally alkylated) phenyl-naphthylamine. Other antioxidants include sulfurized olefins, titanium compounds, and molybdenum compounds. U.S. Pat. No. 4,285,822, for instance, discloses lubricating oil compositions containing a molybdenum and sulfur containing composition. U.S. Patent Application Publication 2006-0217271 discloses a variety of titanium compounds, including titanium alkoxides and titanated dispersants, which materials may also impart improvements in deposit control and filterability. Other titanium compounds include titanium carboxylates such as neodecanoate. Typical amounts of antioxidants will, of course, depend on the specific antioxidant and its individual effectiveness, but illustrative total amounts can be 0.01 to 5 percent by weight or 0.15 to 4.5 percent or 0.2 to 4 percent. Additionally, more than one antioxidant may be present, and certain combinations of these can be synergistic in their combined overall effect.

Viscosity improvers (also sometimes referred to as viscosity index improvers or viscosity modifiers) may be included in the compositions of this invention. Viscosity improvers are usually polymers, including polyisobutenes, polymethacrylic acid esters, hydrogenated diene polymers, polyalkylstyrenes, esterified styrene-maleic anhydride copolymers, hydrogenated alkenylarene-conjugated diene copolymers and polyolefins. Multifunctional viscosity improvers, which also have dispersant and/or antioxidancy properties are known and may optionally be used.

Another additive is an antiwear agent. Examples of antiwear agents include phosphorus-containing antiwear/extreme pressure agents such as metal thiophosphates, phosphoric acid esters and salts thereof, phosphorus-containing carboxylic acids, esters, ethers, and amides; and phosphites. In certain embodiments a phosphorus antiwear agent may be present in an amount to deliver 0.01 to 0.2 or 0.015 to 0.15 or 0.02 to 0.1 or 0.025 to 0.08 percent phosphorus. Often the antiwear agent is a zinc dialkyldithiophosphate (ZDP). For a typical ZDP, which may contain 11 percent P (calculated on an oil free basis), suitable amounts may include 0.09 to 0.82 percent. Non-phosphorus-containing anti-wear agents include borate esters (including borated epoxides), dithiocarbamate compounds, molybdenum-containing compounds, and sulfurized olefins.

Other materials that may be used as antiwear agents include tartrate esters, tartramides, and tartrimides. Examples include oleyl tartrimide (the imide formed from oleylamine and tartaric acid) and alkyl diesters (from, e.g., mixed C12-16 alcohols). Other related materials that may be useful include esters, amides, and imides of other hydroxy-carboxylic acids in general, including hydroxy-polycarboxylic acids, for instance, acids such as tartaric acid, citric acid, lactic acid, glycolic acid, hydroxypropionic acid, hydroxyglutaric acid, and mixtures thereof. These materials may also impart additional functionality to a lubricant beyond anti-wear performance. These materials are described in greater detail in US Publication 2006-0079413 and PCT publication WO2010/077630. Such derivatives of (or compounds derived from) a hydroxy-carboxylic acid, if present, may typically be present in the lubricating composition in an amount of 0.1 weight % to 5 weight %, or 0.2 weight % to 3 weight %, or greater than 0.2 weight % to 3 weight %.

Other additives that may optionally be used in lubricating oils include pour point depressing agents, extreme pressure agents, color stabilizers and anti-foam agents.

Lubricants containing the materials of the disclosed technology may be used for the lubrication of a wide variety of mechanical devices, including internal combustion engines, both two-stroke cycle and four-stroke cycle, spark-ignited and compression-ignited, sump-lubricated or non-sump-lubricated. The engines may be run on a variety fuels including gasoline, diesel fuel, alcohols, bio-diesel fuel, and hydrogen, as well as mixtures of these (such as gasoline-alcohol mixtures, e.g., E-10, E-15, E-85).

The disclosed lubricants are suitable for use as lubricants for marine diesel engines, particularly as cylinder lubricants. In one embodiment, the present technology provides a method for lubricating an internal combustion engine, comprising supplying thereto a lubricant comprising the composition as described herein. The invention is suitable for 2-stroke or 4-stroke engines, in particular marine diesel engines, especially 2-stroke marine diesel engines.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include: hydrocarbon substituents, including aliphatic, alicyclic, and aromatic substituents; substituted hydrocarbon substituents, that is, substituents containing non-hydrocarbon groups which, in the context of this invention, do not alter the predominantly hydrocarbon nature of the substituent; and hetero substituents, that is, substituents which similarly have a predominantly hydrocarbon character but contain other than carbon in a ring or chain. A more detailed definition of the term "hydrocarbyl substituent" or "hydrocarbyl group" is found in paragraphs [0137] to [0141] of published application US 2010-0197536.

As used herein, the term "condensation product" is intended to encompass esters, amides, imides and other such materials that may be prepared by a condensation reaction of an acid or a reactive equivalent of an acid (e.g., an acid halide, anhydride, or ester) with an alcohol or amine, irrespective of whether a condensation reaction is actually performed to lead directly to the product. Thus, for example, a particular ester may be prepared by a transesterification reaction rather than directly by a condensation reaction. The resulting product is still considered a condensation product.

The amount of each chemical component described is presented exclusive of any solvent or diluent oil, which may be customarily present in the commercial material, that is, on an active chemical basis, unless otherwise indicated. However, unless otherwise indicated, each chemical or composition referred to herein should be interpreted as being a commercial grade material which may contain the isomers, by-products, derivatives, and other such materials which are normally understood to be present in the commercial grade.

It is known that some of the materials described above may interact in the final formulation, so that the components of the final formulation may be different from those that are initially added. For instance, metal ions (of, e.g., a detergent) can migrate to other acidic or anionic sites of other molecules. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing the components described above.

EXAMPLES

Example 1

To a 3 L four-necked round-bottom flask, equipped with a thermowell and nitrogen inlet, with subsurface sparge tube, a Dean-Stark trap, Friedrichs condenser, and a scrubber, is charged 501.0 g PDDP. The PDDP is heated to 100° C. and 59.6 g hydrated lime and 22.7 g ethylene glycol are added. The temperature is increased to 121° C. and 163.9 g sulfur is added. The mixture is heated over the course of 20 minutes to 215° C. and maintained at that temperature for an additional 6 hours, at which time 123.3 g diluent oil is added and the reaction is allowed to cool. During this reaction, 32.9 g distillate is collected from the reactor.

The material in the reactor is heated to 135° C., and 204.4 g hydrated lime, 138.2 g ethylene glycol, 43.3 g alkylbenzenesulfonic acid, and 173.5 g decyl alcohol are added. The mixture is heated to 168° C. and maintained at that temperature for 10 minutes, until liquid is no longer readily distilling. Flow of carbon dioxide is begun at 17-25 L/hr (0.6-0.9 ft$^3$/hr) and continued for 4 hours. Volatile materials are removed by stripping at 213-218° C. at less than 5300 Pa (40 torr) for 45 minutes. During cooling, diluent oil (472 g) and polyisobutenes-substituted succinic anhydride (75.3 g) are added. The crude product is filtered through FAX-5™ filter aid.

The overbased product is analyzed by ultra-high performance liquid chromatography for amount of monomeric PDDP (as the Ca salt; including both sulfurized and non-sulfur-reacted monomer). The total amount of monomeric PDDP is 2.02% of the total mixture, including diluent oil and calcium carbonate. This represents a reduction in PDDP content by about 60-75% (relative) compared with overbased phenate prepared by a conventional method.

Example 2

To a 5 L four-necked round-bottom flask, equipped with a thermowell and nitrogen inlet, with subsurface sparge tube, a Dean-Stark trap, Friedrichs condenser, and a scrubber, is charged 1000 g PDDP and 246 g oil. The PDDP and oil are heated towards 100° C. while adding 118 g hydrated lime and 22.3 g ethylene glycol. The temperature is increased to 121° C. and 212 g sulfur is added. The mixture is heated over 60 minutes to 185° C. and then held at that temperature for 4.5 hours.

The batch is then cooled to below 120° C., whereupon 77 g oil, 321 g ethylene glycol, 407 g decyl alcohol, 482 g hydrated lime, and 99 g alkylbenzenesulfonic acid are added. The batch is heated towards 168° C.; upon passing 118° C., 33 g sulfur is added. The batch is held at 168° C. for 45 minutes, after which 208 g of carbon dioxide gas is fed via subline to the reaction mixture over a period of 5 hours at 168° C.

Volatile components are then removed by heating the batch to 218° C., and reducing system pressure to 5300 Pa (40 torr), then holding at this temperature and pressure for one hour. The vacuum is then relieved, and the batch is allowed to cool to 149° C. while adding 900 g oil and 170 g polyisobutenes-substituted succinic anhydride. The crude product is filtered through filter aid, and the filtrate is oil-adjusted to the desired total base number.

The overbased product is analyzed by ultra-high performance liquid chromatography for amount of monomeric PDDP. The total amount of monomeric PDDP is 2.2% of the total mixture, including diluent oil and calcium carbonate. This represents a reduction in PDDP content by about 60-75% (relative) compared with overbased phenate prepared by a conventional method. The mole ratio of sulfur to PDDP, both as incorporated into phenolsulfide, is 1.13, as compared to a ratio of 2.00 for the total moles sulfur charged to the total moles PDDP charged.

Example 3

To a 5 L four-necked round-bottom flask, equipped with a thermowell and nitrogen inlet, with subsurface sparge tube, a Dean-Stark trap, Friedrichs condenser, and a scrubber, is charged 1000 g PDDP and 246 g oil. The PDDP and oil are heated towards 100° C. while adding 118 g hydrated lime and 22.3 g ethylene glycol. The temperature is increased to 121° C. and 212 g sulfur is added. The mixture is heated over 60 minutes to 185° C. and then held at that temperature for 4.5 hours.

The batch is then cooled to below 120° C., whereupon 191 g oil, 105 g ethylene glycol, 128 g decyl alcohol, and 56 g hydrated lime are added. The batch is heated towards 168° C.; upon passing 118° C., 33 g sulfur is added. The batch is held at 168° C. for 2 hours. (This batch is not carbonated.) Volatile components are then removed by heating the batch to 218° C., and reducing system pressure to 5300 Pa (40 torr), then holding at this temperature and pressure for one hour.

The vacuum is then relieved, and the batch is allowed to cool to 149° C. while adding 100 g oil. The crude product is filtered through filter aid, and the filtrate is oil-adjusted to the desired total base number. The final product is analyzed by ultra-high performance liquid chromatography for amount of monomeric PDDP.

The total amount of monomeric PDDP is 5% of the total mixture, including diluent oil. This represents a reduction in PDDP content by about 50% (relative) compared with overbased phenate prepared by a conventional method. The mole ratio of sulfur to PDDP, both as incorporated into phenolsulfide, is approximately 1.1, as compared to a ratio of 2.00 for the total moles sulfur charged to the total moles PDDP charged.

Each of the documents referred to above is incorporated herein by reference, including any prior applications, whether or not specifically listed above, from which priority is claimed. The mention of any document is not an admission that such document qualifies as prior art or constitutes the general knowledge of the skilled person in any jurisdiction. Except in the Examples, or where otherwise explicitly indicated, all numerical quantities in this description specifying amounts of materials, reaction conditions, molecular weights, number of carbon atoms, and the like, are to be understood as modified by the word "about." It is to be understood that the upper and lower amount, range, and ratio limits set forth herein may be independently combined. Similarly, the ranges and amounts for each element of the invention can be used together with ranges or amounts for any of the other elements. As used herein, the expression "consisting essentially of" permits the inclusion of substances that do not materially affect the basic and novel characteristics of the composition under consideration.

What is claimed is:

1. A process for preparing a sulfurized calcium dodecylphenate, comprising:
   (a) reacting (i) dodecylphenol with
      (ii) calcium hydroxide in an amount of about 0.35 to about 0.6 moles per mole of dodecylphenol charged and
      (iii) ethylene glycol in an amount of about 0.09 to about 0.6 moles per mole of dodecylphenol charged; and
   (b) reacting the product of step (a) with
      (iv) sulfur in an amount of about 1.9 to about 3 moles per mole of dodecylphenol charged, the reaction of step (b) being conducted at about 180° C. to about 220° C.; and thereafter optionally
   (c) reacting the product of step (b) with additional alkaline earth metal hydroxide or alkaline earth metal oxide and with carbon dioxide so as to form an overbased phenate.

2. The process of claim 1 wherein the amount of ethylene glycol is about 0.13 to about 0.26 moles per mole of dodecylphenol charged.

3. The process of claim 1 wherein step (a) is conducted at about 100° C. to about 140° C.

4. The process of claim 1 wherein optional step (c) is performed.

5. The process of claim 1 wherein optional step (c) is performed and includes the addition of an additional amount of sulfur, provided that the total amount of sulfur added throughout the steps of the process does not exceed about 3 moles per mole of dodecylphenol charged.

6. The process of claim 1 wherein optional step (c) is performed and includes the addition of diluent oil and one or more hydroxy-containing materials comprising at least one material selected from the group consisting of an alkylene glycol, an alcohol of about 6 to about 20 carbon atoms, and an alkylbenzenesulfonic acid, and mixtures thereof; and the subsequent removal of volatile materials.

7. The process of claim 6 wherein the amount of the one or more hydroxy-containing materials is about 1 to about 3 moles per mole of dodecylphenol charged.

8. The process of claim 1 wherein step (c) is performed and the amount of additional calcium hydroxide or calcium oxide is sufficient to provide a product with a total base number of about 200 to about 600 on an oil free basis.

9. The product prepared by the process of claim 1.

10. The product of claim 9 wherein the mole ratio of sulfur to dodecylphenol monomer units within the product is about 0.95:1 to about 1.5:1.

11. The product of claim 9 having less than about 15 percent by weight of monomeric dodecylphenol monomer units, based on the total amount of dodecylphenol units present.

12. A lubricant composition comprising an oil of lubricating viscosity and the product of claim 9.

13. A method for lubricating an internal combustion engine, comprising supplying thereto the lubricant composition of claim 12.

14. The process of claim 1 wherein the amount of sulfur is about 2.2 to about 3 moles per mole of dodecylphenol charged.

* * * * *